United States Patent
Kurihara et al.

(10) Patent No.: US 8,182,596 B2
(45) Date of Patent: May 22, 2012

(54) DISCOLORABLE INK COMPOSITION AND WRITING UTENSILS

(75) Inventors: Norimasa Kurihara, Shijonawate (JP); Hiroshi Inoue, Higashiosaka (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 12/741,540

(22) PCT Filed: Nov. 10, 2008

(86) PCT No.: PCT/JP2008/070380
§ 371 (c)(1),
(2), (4) Date: Jul. 20, 2010

(87) PCT Pub. No.: WO2009/060972
PCT Pub. Date: May 14, 2009

(65) Prior Publication Data
US 2010/0275813 A1 Nov. 4, 2010

(30) Foreign Application Priority Data
Nov. 9, 2007 (JP) ................ P2007-291837

(51) Int. Cl.
*C09D 11/02* (2006.01)
(52) U.S. Cl. .................. 106/31.32; 106/31.64
(58) Field of Classification Search ............... 106/31.32, 106/31.64
See application file for complete search history.

(56) References Cited

U.S. PATENT DOCUMENTS

| 6,017,386 A * | 1/2000 | Sano et al. .................. 106/31.32 |
| 6,203,603 B1 | 3/2001 | Takayama et al. |
| 2006/0112851 A1 * | 6/2006 | Ono et al. .................. 106/31.16 |

FOREIGN PATENT DOCUMENTS

| JP | 1-138275 | 5/1989 |
| JP | 5-87105 | 12/1993 |
| JP | 9-165537 | 6/1997 |
| JP | 2000-56497 | 2/2000 |
| JP | 2000-191933 | 7/2000 |
| JP | 2001-123084 | 5/2001 |
| JP | 2001-279144 | 10/2001 |
| JP | 2003-268248 | 9/2003 |
| JP | 2004-137510 | 5/2004 |
| JP | 2005-89548 | 4/2005 |
| JP | 2005-298746 | 10/2005 |

* cited by examiner

*Primary Examiner* — Jerry Lorengo
*Assistant Examiner* — Veronica F Faison
(74) *Attorney, Agent, or Firm* — Hamre, Schumann, Mueller & Larson, P.C.

(57) ABSTRACT

The invention provides a discolorable ink composition which is irreversibly erasable by heating to about 40° C. to 120° C. A discolorable ink composition, where an electron-donating color-forming organic compound and an electron-accepting compound are incorporated in wax particles, whereby the electron-donating color-forming compound in a state color-developed by the electron-accepting compound is separated from a decolorizer and kept in the color-developed state, while when the wax is liquefied by heating, the decolorizer reacts with the electron-accepting compound to convert the electron-donating color-forming organic compound into a decolorized state.

16 Claims, No Drawings

DISCOLORABLE INK COMPOSITION AND WRITING UTENSILS

TECHNICAL FIELD

The present invention relates to a discolorable ink composition, which provides characters or a coating film written or printed on a paper, each of which characters and coating film can be discolored to another color by heating, and the color of the discolored characters or coating film hardly returns to its original color, as well as writing instruments (or writing utensils or writing implements) using such discolorable ink composition.

BACKGROUND ART

Various discolorable ink compositions, which enable writing trace or a coating film formed by handwriting or printing on a paper to be decolorized by being heated or by using an organic solvent, have been proposed. The discolorable ink composition is useful for contributing to reuse of papers or useful for easy correction of errors in writing trace.

For example, Patent Literature 1 (JP 9-165537 A) proposes a thermally erasable ink composition prepared by dispersing a colorant, which is obtained by a reaction of a leuco dye with a developer to develop a color, and a decolorization agent in water.

Patent Literature 2 (JP 2001-123084 A) proposes a decolorizable pigment composition comprising a color developer, a color forming compound and a decolorizing agent, wherein the main component of the decolorizing agent in the composition exists in a microparticulate or microphase-separated state having a mean particle diameter of 1 nm to 100 μm when their shapes are approximately regarded as spheres in the colored state, and the main component of the decolorizing agent in the composition is molecularly dispersed in the composition in the decolorized state.

Patent Literature 3 (JP 5-87105 B) proposes an ink composition for ink jet printing which fades on heating, being prepared by dispersing, by mixing as separate particles, a resin composition comprising at least a heat-meltable water-insoluble resin of a melting or softening point of 60-180° C., a color former, and a volatile developer with a nonvolatile desensitizer of a melting or softening point of 60-180° C. or a resin composition containing this desensitizer.

Patent Literature 4 (JP 2005-89548 A) proposes a liquid composition having a thermosensitive color-changing property and a color-memorizing property comprising a microcapsule pigment and a vehicle containing a resin, wherein the microcapsule pigment occludes a composition having the thermosensitive color-changing property and color-memorizing property, which composition comprises a homogeneous compatibilized mixture of (1) an electron-donative color developing organic compound, (2) an electron-receptive compound, and (3) a particular ester compound as a reaction medium controlling the coloration reaction of the above (1) and (2).

Patent Literature 1: JP 9-165537 A
Patent Literature 2: JP 2001-123084 A
Patent Literature 3: JP 5-87105 B
Patent Literature 4: JP 2005-89548 A Problems to be Solved by the Invention Each of the compositions disclosed by the above Patent Literatures still has room for improvement in order that they are used as an decolorizable ink composition. For example, the thermally erasable ink composition disclosed by Patent Literature 1 has a possibility to cause decolorization without being heated, since the colorant and the decolorization agent are dispersed together in water and thereby the probability that the colorant contacts with the decolorization agent comes to considerably high. In order to make such a possibility low and to make the stability of the colorant high, it is necessary to select the decolorization agent so that it functions at a higher temperature. However, such a decolorization agent would increase the amount of heat necessary for the decolorization high, make the cost for the decolorization high, and/or require a heating apparatus for the decolorization operation, so that the decolorization operation would become difficult for everyone to do.

In the decolorizable color composition disclosed by Patent Literature 2, it is required to control the size of the decolorization agent in the colored state, which makes the preparation of the composition difficult. In addition, Patent Literature 2 discloses to increase the temperature up to 190° C. or 200° C. in order to make the decolorized state. Thus, in order to attain such a high temperature, a significant amount of heat is required and some heating device is inevitably used for the decolorization operation.

The ink composition disclosed by Patent Literature 3 is practically used to provide clothes and so forth with a positional information for cutting or sewing or indices of name of components or usage, so that the ink composition is not intended to be used for printing or writing on a paper. In addition, the decolorizing temperature adopted in Examples of Patent Literature 3 is as high as 160° C. and 150° C., so that the ink composition disclosed therein has the problem which is similar to the problems pointed out in connection with Patent Literatures 1 and 2.

The composition having the thermosensitive color-changing property and color-memorizing property disclosed by Patent Literature 4 has a tendency to decrease its color concentration as the temperature increases (i.e. the color disappears) as shown in FIGS. 1 and 2 thereof. Thereafter, as the ink composition is cooled, the color concentration is maintained at a low level. However, when the temperature falls below a certain temperature, the color concentration increases again. Therefore, characters which were printed or written with the ink composition were once erased, there are occasions that the erased characters "return" to appear again at a certain temperature. In the case, for example, where it is required to reuse papers, from which characters were erased or where it is required to further write characters on portions, from which characters were erased, such "return" should be avoided.

Thus, the decolorizable ink composition in the prior art still had rooms for improvement depending on the usage thereof with regard to the matters such as a temperature necessary for decolorization, stability of coloring, easiness of production, and stability of decolorized state. An object of the present invention is to provide a discolorable ink composition, which stably maintains its coloring in characters printed or written on a paper and so on, which is capable to be erased by applying an amount of heat which can be caused by scrubbing the surface of the paper such as a frictional heat, and which stably maintains its decolorized state after being decolorized. Another object of the present invention is to provide a discolorable ink composition, which changes its color by being heated and is hardly capable to return to the original color after its color has been changed.

Means for Solving the Problem

According to the discolorable ink composition of the present invention, the above problems have been solved by separating the group of an electron-donative color developing organic compound and an electron-receptive compound from a decolorization agent by using a wax in the colored state wherein the electron-donative color developing organic compound is colored with the electron-receptive compound.

In a first aspect, the present invention provides a discolorable ink composition comprising wax particles which contain an electron-donative color developing organic compound and an electron-receptive compound, a decolorization agent and water.

In a second aspect, the present invention provides a discolorable ink composition comprising wax particles which contain an electron-donative color developing organic compound and an electron-receptive compound, another wax particles which contain the decolorization agent and water.

Hereinafter, the term "discoloration" (or "discoloring") means a phenomenon in which at least one of hue, saturation and intensity of color changes, which phenomenon includes a concept of changing of color to colorless state (i.e. "decolorizing" and "color-fading"). Further, each of the terms "decolorizing" and "color erasing" is used to mean not only disappearing a color completely, that is, making a colorless state, but also fading a color, that is, making a state close to the colorless state.

In the discolorable ink composition of the present invention, before heating, that is, in a condition where the electron-donative color developing organic compound develops a color due to the presence of the electron-receptive compound, a wax in a particulate form contains at least the electron-donative color developing organic compound and the electron-receptive compound to prevent the electron-donative color developing organic compound from contacting with the decolorization agent, whereby good coloring of the electron-donative color developing organic compound is maintained. Discoloration is made by liquefying the wax and thereby causing the decolorization agent to approach the electron-donative color developing organic compound and to interact with the electron-receptive compound. In the case where the present discolorable ink composition contains only the electron-donative color developing organic compound as the color developing ingredient, the color of the present discolorable ink composition will disappear (i.e. the present discolorable ink composition will be discolored) by heating.

The decolorization agent preferably is a basic compound in any of the aspects of the present discolorable ink composition. Here, the basic compound means a compound which has a property to donate an electron pair. The basic compounds specifically include:

an aliphatic amine, an aliphatic diamine, an amino alcohol, an aromatic compound having at least one amino group and having an alkylene group between the amino group and an aromatic ring in the molecule, a compound represented by a general formula $NH_2—C_2H_4—(NH—C_2H_4)_n—NH_2$ ($n \geq 0$) and derivatives thereof, imidazole and derivatives thereof, and a compound generally referred to as a hindered amine, which compound has a piperidyl group and derivatives thereof in the molecule. These compounds easily react with the electron-receptive compound, and provides the ink composition with good discolorability.

It is preferable that the wax particle has a melting point in a range of from 40° C. to 120° C. The temperature in this range is a temperature that is obtained by a frictional heat, which may be caused by scrubbing a character or a coating film written or printed on a paper with an elastic material.

Therefore, it is capable to discolor the character or the like written or printed on a paper by scrubbing it with an elastic material, when a wax having the melting point within the above temperature range is used.

The discolorable ink composition of the present invention may further contain a colorant which does not discolor upon being heated. In such case, the color of the colorant will appear when the electron-donative color developing organic compound changes into a decolorized condition by the influence of the decolorization agent.

The discolorable ink composition of the present invention can be used as an ink for writing instruments (or writing utensils or writing implements). The writing trace or the like written with the writing instrument which uses the discolorable ink composition of the present invention as the ink therefor can be discolored (e.g. disappeared) by, for example, being scrubbed with an elastic material such as an eraser or an soft elastic resin, after the writing trace or the like has been written. Alternatively, the present discolorable ink composition can be used as an ink for ink jet printers.

Effect of the Invention

The discolorable ink composition of the present invention develops a color in a state in which:

the electron-donative color developing organic compound and the electron-receptive compound are contained in the wax particles;

the color of the electron-donative color developing organic compound is developed by the electron-receptive compound; and the decolorization agent is preferably contained within another wax particles. When the waxes are liquefied by being heated, the electron-donative color developing organic compound is changed to decolorized state. That is, the colored electron-donative color developing organic compound is separated from the decolorization agent by the wax particles at room temperature, and thereby the decolorization of the discolorable ink composition of the present invention is avoided. Then when it is heated, the wax particles are liquefied and becomes a common medium for the ingredients, thereby decolorization of the electron-donative color developing organic compound is facilitated.

Therefore, when the ink composition of the present invention contains only the electron-donative color developing organic compound as the color developing ingredient, both of the maintenance of good coloring and the performance of secured decolorization are compatibly obtained. When the ink composition of the present invention contains the colorant which does not discolor by heating, the color changes from a mixed color formed by mixing the color of the electron-receptive compound in the color developed state with the color of the colorant, to another color where the color of the colorant predominantly appears. Thus, the present discolorable ink composition successfully shows different colors before and after the heating.

Since the waxes having the melting points in the range of from 40° C. to 120° C. are selected in the present discolorable ink composition of the present invention, decolorization can be made by relatively small amount of heat. Therefore, it is possible to discolor the characters or the coating film by a relatively simple operation such as scrubbing of the written characters or the formed coating film.

DETAILED DESCRIPTION OF THE INVENTION

Best Modes for Carrying Out the Invention

The discolorable ink composition of the present invention contains an electron-donative color developing organic compound, an electron-receptive compound, a decolorization agent and water; and takes any one of the two modes, which consists of 1) a mode in which the combination of the electron-donative color developing organic compound and the electron-receptive compound are contained in wax particles; and 2) another mode in which the combination of the electron-donative color developing organic compound and the electron-receptive compound are contained in one kind of wax particles and the decolorization agent is contained in another kind of wax particles. It is possible to obtain a stable color developing state by incorporating both the electron-donative color developing organic compound and the electron-receptive compound into the wax particles. Further, when the decolorization agent is incorporated in another wax particles, it is capable to prevent the inhibition of the decolorizing property of the decolorization agent, which is caused by the reaction of the decolorization agent with additives contained in the ink composition. Hereinafter, the ingredients contained in the discolorable ink composition (which may be merely referred to as the "ink composition") of the present invention are described.

Electron-Donative Color Developing Organic Compound

The discolorable ink composition of the present invention contains an electron-donative color developing organic compound. The electron-donative color developing organic compound is a compound which develops a color by reacting with an electron-receptive compound, so that it may be referred to as a color former ingredient. The electron-donative color developing organic compound is not particularly limited, and any of known electron-donative color developing organic compounds (for example, a leuco dye) can be optionally used. Specifically, for example, the following compounds may be used as the electron-donative color developing organic compound.

Fluorans, for example, 1,2-benzo-6-(N-ethyl-N-isoamylamino)fluoran, 2-anilino-3-methyl-5-(N-ethyl-N-n-propylamino)fluoran, 2-chloro-3-methyl-6-(4-di-n-butylaminoanilino)fluoran, 3-diethylamino-6-benzyloxyfluoran, 3,6-diphenylaminofluoran, 2'-[(2-chlorophenyl)amino]-6'-(dibutylamino)spiro [isobenzofluoran-1(3H), 9'-(9H)xanthene]-3-one, 6'-[ethyl(4-methylphenyl)amino]-2'-methyl-spiro [isobenzofluoran-1(3H), 9'-(9H)xanthene]-3-one, and 6-(dimethylaminoamino)-3,3-bis[4-(dimethylamino) phenyl]-1(3H)-isobenzofluoran;

Phenothiazines, for example, benzoyl leucomethylene blue, ethyl leucomethylene blue;

Indolines, for example, 2-(phenyliminoethylidene)-3,3-dimethylindoline.

Spiropyrans, for example, 1,3,3-trimethyl-indolino-7-chloro-β-naphthospiropyran, N-3,3-trimethyl-indolinobenzospiropyran;

Leucoauramines, for example, N-acetylauramine and N-phenylauramine;

Rhodamine lactams, for example, rhodamine B lactam;

Polyarylcarbinols, for example, crystal violet carbinol and malachite green carbinol;

Diphenyl methane phthalides, for example, 3,3-bis(p-dimethylaminophenyl)-6-dimethylaminophthalide, 3,3-bis (p-dimethylaminophenyl)phthalide, Triphenyl methane phthalides, for example, crystal violet lactone, malachite green lactone;

Phenylindolylphthalides, for example 3-(4-diethylaminophenyl)-3-(1-ethyl-2-methylindole-3-yl)phthalide, 3-(2-methyl-4-diethylamino)phenyl-3-(1-(2-methoxyethyl)-2-methylindole-3-yl)phthalide.

Diphenylmethaneazaphthalides, for example, 3,3-bis-(2-ethoxy-4-diethylaminophenyl)-4-azaphthalide;

Phenylindolylazaphthalides, for example, 3-(2-ethoxy-4-diethylaminophenyl)-3-(1-ethyl-2-methylindole-3-yl)-4-azaphthalide, 3-(4-diethylamino-2-methylphenyl)-3-(1-ethyl-2-methylindole-3-yl)-4-azaphthalide;

Styrylquinolines, for example, 2-(3-methoxy-4-dodecoxystyryl)quinoline;

pyridines, for example, 2,6-bis(6-n-butoxyphenyl)-4-(4-dimethylaminophenyl)pyridine;

Quinazolines, for example, 2-(4-dimethylaminophenyl)-4-methoxyquinazoline, 2-(4-dimethylaminophenyl)-4-(1-chlorophenyloxy)quinazoline;

Bisquinazolines, for example, 4,4'-(ethylenedioxy)-bis[2-(4-diethylaminophenyl)quinazoline], 4,4'-(ethylenedioxy)-bis[2-(4-piperidinophenyl)quinazoline];

Ethylenophthalides, for example, 3,3-bis[1,1-bis-(p-dimethylaminophenyl)ethyleno-2]phthalide, 3,3-bis[1,1-bis-(2-methyl-4-dimethylaminophenyl)ethyleno-2]phthalide;

Ethylenoazaphthalides, for example, 3,3-bis[1,1-bis-(p-dimethylaminophenyl)ethyleno-2]-4-azaphthalide, 3,3-bis[1,1-bis-(p-dimethylaminophenyl)ethyleno-2]-4,7-diazaphthalide;

Fluorenes, for example, 3,6-bis(dimethylamino)fluorenespiro(9.3°)-4'-azaphthalide, 3,6-bis(dimethylamino) fluorenespiro(9.3°)-7'-azaphthalide.

As the electron-donative color developing organic compound, 2'-[(2-chlorophenyl)amino]-6'-(dibutylamino)spiro [isobenzofluoran-1(3H), 9'-(9H)xanthene]-3-one, 3,6-diphenylaminofluoran, 6'-[ethyl(4-methylphenyl)amino]-2'-methyl-spiro[isobenzofluoran-1(3H), 9'-(9H)xanthene]-3-one and 6-(dimethylaminoamino)-3,3-bis[4-(dimethylamino)phenyl]-1(3H)-isobenzofluoran which are included in fluorans are preferably used. Only one compound or a plurality of compounds may be used as the electron-donative color developing organic compound.

It is preferable that the range of the content of the electron-donative color developing organic compound contained in the ink composition is from 0.01% to 20% by weight, and more preferably from 0.1% to 10% by weight based on the ink composition as a whole. When the content of the electron-donative color developing organic compound is too low, the color optical density becomes low. When the content of the electron-donative color developing organic compound is too high, some cases that the electron-donative color developing organic compound deposits may occur. Such deposited electron-donative color developing organic compound would not develop a color by the electron-receptive compound contained in the wax particles, or would clog the ink discharging portion in a printer (for example, an ink jet printer) or a writing instrument.

It is preferable that the electron-donative color developing organic compound is contained in the wax particles in an amount of from 0.1% by weight to 40% by weight, more preferably from 1% by weight to 20% by weight in the wax particles. When the electron-donative color developing organic compound is contained in the wax particles in an amount less than 0.1% by weight, the color optical density is low. When the electron-donative color developing organic compound is contained in a single wax particle in an amount above 40% by weight, the electron-donative color developing organic compound tends to deposit, and thereby granulation of the wax would become difficult.

Electron-Receptive Compound

The electron-receptive compound acts on the electron-donative color developing organic compound, thereby the electron-donative color developing organic compound is caused to develop a color. The electron-receptive compound is a compound which has an active proton, a pseudo acidic compound or a compound having an electron hole.

The electron-receptive compound is not particularly limited. For example, a compound having a phenolic hydroxyl group (such as phenol, o-cresol, m-octylphenol, n-dodecylphenol, n-stearylphenol, carboxylic acids and the metal salts thereof (such as zinc salicylate, zinc 3,5-di(alpha-methylbenzyl) salicylate), acidic phosphate esters and metal salts thereof, urea thiourea-based compound and derivatives thereof and 1,2,3-triazole and derivatives thereof may be used as the electron-receptive compound.

The electron-receptive compound preferably has involatility and lacks sublimability. When the electron-receptive compound has volatility or sublimability, color concentration developed on a printed or written characters or coating film may change with time.

Zinc salicylate and zinc 3,5-di(alpha-methylbenzyl) salicylate are preferably used as the electron-receptive compound. Only one kind of compound or a plurality of compounds may be used as the electron-receptive compound.

It is preferable that the range of the content of the electron-receptive compound is from 0.01% to 50% by weight, and more preferably from 0.1% to 20% by weight of the ink composition as a whole. When the content of the electron-receptive compound is too low, the color optical density becomes low. When the content of the electron-receptive compound is too high, the electron-receptive compound may deposit. The deposited electron-receptive compound would clog the ink discharging portion in the printer (for example, the ink jet printer) or the writing instrument.

The content of the electron-receptive compound is preferably in a range of from 0.1% by weight to 60% by weight, and more preferably from 1% by weight to 40% by weight in the wax particles. When the electron-receptive compound is contained in an amount less than 0.1% by weight in a single wax particle, the color optical density decreases. When the electron-receptive compound is contained in an amount above 60% by weight, the electron-receptive compound may deposit, and thereby granulation of the wax would become difficult.

Decolorization Agent

The decolorization agent inhibits the color-developing function of the electron-receptive compound. Therefore, the decolorization agent performs a function to remove or dilute a developed color given by the electron-donative color developing organic compound when an erasing operation is carried out. The decolorization agent is preferably a basic compound. It is considered that the discoloring ability of the ink composition depends on the strength of the basicity of the decolorization agent. As the basicity of the decolorization agent is stronger, the color of the electron-donative color developing organic compound in its colored state can be made decolorized state more successfully, improving the discolorability of the ink composition by heating. In the present invention, as the decolorization agent, it is preferable to use a compound selected from the group consisting of the following compounds.

An aliphatic amine,
An aliphatic diamine,
An amino alcohol,
An aromatic compound having at least one amino group and an alkylene group between the amino group and an aromatic ring in the molecule,
A compound represented by a general formula $NH_2—C_2H_4—(NH—C_2H_4)_n—NH_2$ ($n \geq 0$) and derivatives thereof,
imidazole and derivatives thereof, and
a compound generally referred to as a hindered amine, which compound has a piperidyl group and derivatives thereof in the molecule.

The aliphatic amine is a primary amine, a secondary amine or a tertiary amine. The aliphatic amine is preferably the secondary amine or the tertiary amine. The aliphatic amines specifically include octyl amine, decyl amine, dioctyl amine, didecyl amine, didodecyl amine, trioctyl amine, stearyl amine, behenyl amine, dimethyl lauryl amine, dimethyl palmityl amine, dimethyl stearyl amine, distearyl amine and bis(2-hydroxyethyl)oleylamine and so forth.

The aliphatic diamine is a compound in which two hydrogen atoms are replaced with two amino groups in the aliphatic compound. There is a tendency that the diamine shows higher decolorizing property as the decolorization agent, as the number of the carbon atom in the aliphatic diamine. However, when the number of the carbon atoms exceeds a certain number, the decolorizing property will not be so increased. Therefore, the aliphatic diamine is preferably a compound which has three (3) to thirty (30) carbon atoms, more preferably six (6) to twenty-two (22) carbon atoms. The aliphatic diamines specifically include a diamino decane, a diamino octane, a hexamethylene diamine, a diamino butane, a hydrogenated tallow diamine, and a hydrogenated tallow propylene diamine and so forth.

The amino alcohol is a compound which has a hydroxyl group and an amino group. It is preferable that the amino alcohol is the secondary alcohol or the tertiary alcohol from the viewpoint of the discoloring property of the decolorization agent. The amino alcohols specifically include isopropanol amine, diisopropanol amine, benzylethanol amine and triisopropanol amine and so forth.

The aromatic compounds having at least one amino group and the alkylene group between the amino group and the aromatic ring in the molecule specifically include xylylene diamine, benzylethanol amine, a copolymer of methaxylylenediamine with styrene and so forth. The benzylethanolamine may be classified to belong to an amino alcohol as mentioned above.

The compound represented by the general formula $NH_2—C_2H_4—(NH—C_2H_4)_n—NH_2$ ($n \geq 0$) and derivatives thereof exhibit more excellent discoloring property as the decolorization agent, as the molecular weight thereof is higher. This compound may have a molecular weight, for example, in a range of from 100 to 100,000. The compound represented by the general formula $NH_2—C_2H_4—(NH—C_2H_4)_n—NH_2$ (n0) and derivatives thereof specifically include diethylenetriamine, triethylenetetramine, tetraethylenepentamine pentaethylenehexamine, ethylene oxide adducts of diethylenetriamine, propylene oxide adducts of diethylenetriamine, and butylene oxide adducts of diethylenetriamine and so forth.

Imidazole and derivatives thereof specifically includes imidazole, 2-phenylimidazole and so forth.

The compounds generally referred to as a hindered amine, which compound has a piperidyl group and derivatives thereof in the molecule include tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butanetetracarboxylate, a copolymer of N,N'-bis(2,2,6,6-tetramethyl-4-piperidyl)-1,6-hexamethylenediamine with 2,4-dichloro-6-(4-morpholinyl)-1,3,5-triazine, a copolymer of N,N'-bis(1,2,2,6,6-pentamethyl-4-piperidyl)-1,6-hexamethylenediamine with 2,4-dichloro-6-(4-morpholinyl)-1,3,5-triazine, 2,2,4,4-tetramethyl-7-oxa-3,20-diazadispiro-[5.1.11.2]-heneicosane-21-one and so forth.

Of these compounds, dioctylamine, diaminodecane, pentaethylenehexamine, hexamethylenediamine, behenylamine, distearylamine, hydrogenated tallow propylenediamine, butylene oxide adducts of diethylenetriamine, a copolymer of methaxylylenediamine with styrene, tetrakis(2,2,6,6-tetramethyl-4-piperidyl)-1,2,3,4-butanetetracarboxylate are preferably used.

It is preferable that the decolorization agent is contained in an amount of from 0.01% to 50% by weight, and more preferably from 0.1% to 20% by weight in the ink composition as a whole. When the content of the decolorization agent is too low, the decolorization agent fails to sufficiently erase the color of the electron-donative color developing organic compound, so that the discoloring effect of the ink comes to be insufficient. When the content of the decolorization agent is too high, storage stability of the ink composition comes to be degraded. The amount of the decolorization agent to be used is preferably selected considering the amount of the electron-receptive compound. It is preferable to select each amount of the decolorization agent and the electron-receptive compound, so that (the decolorization agent):(the electron-receptive compound)=1:10 to 10:1 (weight ratio) in the ink composition as a whole.

In the case where the decolorization agent is contained within the wax particles, the content of the decolorization agent is preferably in a range of from 1% by weight to 80% by weight and is more preferably in a range of from 5% by weight to 60% by weight in the wax particles. When the content of the decolorization agent is less than 1% by weight in a single wax particle, there are occasions that a sufficient discoloring effect can not be obtained during the discoloring operation of the ink composition with heating. When the decolorization agent itself is in a waxy state (that is, the decolorization agent is in a solid state at around room temperature and changes into a liquid state by being heated), the decolorization agent may be used as it is so that the particles of the decolorization agent are dispersed into the ink composition.

Waxes

The ink composition of the present invention includes wax particles, which contain the electron-donative color developing organic compound and the electron-receptive compound (referred to as "first wax particles" for the sake of convenience), and optionally further includes wax particles, which contain the decolorization agent (referred to as "second wax particles" for the sake of convenience).

Wax has advantage that the discoloring temperature range can be easily controlled, since the wax has a narrower temperature range from the temperature at which the wax starts liquidification to the temperature at which wax finishes the liquidification compared with those range of the resins. The wax preferably has its melting point (accurately, a temperature at which liquidification of the wax begins) in a range of from 40° C. to 120° C., more preferably in a range of from 40° C. to 80° C., further more preferably in a range from 50° C. to 70° C., still further more preferably in a range from 50° C. to 70° C., and most preferably in a range of 55° C. or more and less than 60° C. The wax having its melting point within the above range liquefies by a friction heat, for example, when writing trace or a coating film handwritten on a paper is scrubbed with an eraser or a soft elastic resin. Thus, the ink composition containing the particles of such wax provides an ink composition which enables the writing trace to be discolored (e.g. erased) as though the writing trace is erased by scrubbing with an eraser. When the melting point is less than 40° C., the wax may fail to turn into particulate form, so that the stability of the developed color could decrease and sufficient color concentration could not be obtained, or color could be diluted with time. When the melting point exceeds 120° C., the wax would not liquefy by being scrubbed with an eraser or a soft elastic resin, thus it becomes to difficult for the user to discolor the ink composition with a simple operation.

The wax that has the melting point in a range of from 40° C. to 120° C., for example, includes the following compounds. Each parenthesized value shows the melting point.

Aliphatic acids: lauric acid (44° C.), myristic acid (54° C.), palmitinic acid (63° C.), stearic acid (70° C.), behenic acid (80° C.) and so forth;

Aliphatic acid esters: methyl behenate (53° C.), stearyl laurate (42° C.), stearyl stearate (55° C.), stearyl palmitate (58° C.), behenyl behenate (73° C.) and so forth.

Aliphatic acid anhydride: myristic anhydride (53° C.), palmitic anhydride (64° C.), stearic anhydride (71° C.) and so forth.

Acyl glycerin: 2-monolaurin glycerin (52° C.), 2-monomyristine glycerin (61° C.), 2-monopalmitine glycerin (69° C.), 1-palmitoyl-2-olein glycerin (46° C.), 1-stearoyl-2-olein glycerin (54° C.), glycerin monostearate (66° C.), mixture of glycerin monostearate with glycerin distearate (60° C.), mixture of glycerin distearate with glycerin tristearate (56° C.) and so forth.

Alcohol: cetyl alcohol (49° C.), stearyl alcohol (58° C.), arachinyl alcohol (66° C.), 1-docosanol (71° C.) and so forth.

Aliphatic acid amide: recinoleic acid amide (62° C.), oleic acid amide (75° C.), lauric acid amide (87° C.), behenic acid amide (110° C.), stearic acid amide (101° C.), hydroxystearic acid amide (107° C.).

Others: paraffin wax (melting point 48° C. to 112° C. depending on the molecular weight, branching state, and the production process), pentaerythritol tetra stearate (64° C.), pentaerythritol tetra palmitate (69° C.), ethylene glycol distearate (63° C.), propylene glycol mono-behenate (57° C.), distearyl thiodipropionate (65° C.), sorbitan tristearate (54° C.), and sorbitan palmitate (58° C.).

In the ink composition of the present invention, it is preferable that the wax is particularly any of stearyl alcohol, mixture of glycerin monostearate with glycerin distearate, mixture of glycerin distearate with glycerin tristearate, recinoleic acid amide and propylene glycol mono-behenate. However, it is not necessarily limited thereto as long as the wax can dissolve the electron-donative color developing organic compound and the electron-receptive compound as well as the decolorization agent. As the wax, two or more compounds selected from the above compounds may be used.

In the case where the ink composition of the present invention contains both of the first wax particles and the second wax particles, the first wax particles preferably have a melting point similar to that of the second wax particles. When two kinds of wax particles are formed of waxes which are similar in melting point, the two waxes can liquefy at the same (or similar) temperature (range) and makes it possible to make the discoloring agent act on the electron-receptive compound, so that discoloring operation may be smoothly performed. Alternatively, the first wax particles and the second wax particles may be formed from the same wax or waxes different from each other. Further, in the first wax particles, a wax forming a group of the particles may be different from a wax forming another group of the particles. The same is applicable to the second wax.

In the first wax particles, it is preferable that the wax constitutes 30% by weight to 99% by weight, more preferably 50% by weight to 95% by weight of the particles. In the first wax particles, when an amount of the wax is too low, the electron-donative color developing organic compound deposit, making the particulation difficult. When an amount of the wax is too much, the color optical density decreases.

In the second wax particles, it is preferable that the wax constitutes 20% by weight to 99% by weight, more preferably from 40% by weight to 95% by weight of the particles. In the second wax particles, when an amount of the wax is too low, then the solid content thereof lowers, making particulation difficult. When an amount of the wax is too much, the amount of the decolorization agent is low, which may make discoloring effect of the ink composition to be insufficient.

It is preferable that the wax is contained in an amount of from 5% to 60% by weight, more preferably in an amount of from 10% to 50% by weight in the ink composition as a whole. In the ink composition of the present invention, considering that the electron-donative color developing organic compound is essentially contained in the first wax particles, when the amount of the wax is too low, then the amount of the electron-donative color developing organic compound comes to low and thereby the color optical density may decrease. When the amount of the wax is too much, the storage stability of the ink composition may decrease.

Water

The ink composition of the present invention contains water which functions as a dispersion medium. Water typically used as water, for example, ion exchanged water and distilled water may be used. The content of water is not particularly limited, but is optimally selected depending on the contents of the first and/or the second wax particles and the viscosity to be obtained. For example, the content of water can be in a range of from 95% by weight to 40% by weight, preferably from about 90% by weight to about 50% by weight.

Non-Thermochromic Colorant

In addition to the above mentioned ingredients, the ink composition of the present invention may further contain a colorant of which hue does not change upon heating, i.e. a non-thermochromic colorant. It is preferable that the non-thermochromic colorant is not affected by the electron-receptive compound and the decolorization agent, and is not discolored by them. When the ink composition of the present invention contains the non-thermochromic colorant, the ink composition of the present invention provides an ink composition, which exhibits a color that is formed by mixing a color that the electron-donative color developing organic compound exhibits in its colored state with the color that the colorant exhibits before being heated, and which exhibits a color wherein the color that the electron-donative color developing organic compound exhibits has been paled out, thereby the color that the colorant exhibits comes to be thicken after being heated. Therefore, the ink composition containing such colorant is a discolorable ink composition, for example, which changes its hue from a certain hue to another hue.

The non-thermochromic colorants include, for example, in addition to water-soluble dyes such as acid dyes, direct dyes, basic dyes and so forth, inorganic pigments, such as carbon black, titanium oxide, alumina, silica and talc; organic pigments, such as azo-based pigments, naphthol-based pigments, phthalocyanine-based pigments, indanthrene-based pigments, quinacridone-based pigments, anthraquinone-based pigments, dioxane-based pigments, dioxazine-based pigments, indigo-based pigments, thioindigo-based pigments, perinone-based pigments, perylene-based pigments, indolenone-based pigments, and azomethine-based pigments; metal powder pigments such as aluminum powder and bronze powder; fluorescent pigments; pearl pigments; and photoluminescent pigments and so forth. Further, these colorants can also be used as a pigment dispersion. In the ink composition of the present invention, these colorant may be used alone or in combination as a mixture of two or more of them.

Alternatively, as the non-thermochromic colorant, plastic pigments (i.e. synthetic-resin particle pigments) having various shapes such as spherical shape, flattened shape, hollow shape and so forth may be used. In the present invention, for example, the plastic pigments can be used as a resin powder having a particle size of 100 micrometers or less or as a dispersion, wherein a resin powder having a particle size of 100 micrometers or less is dispersed in water. The above resin powder can be used as a colored resin emulsion by being colored with a pigment or a dye.

The amount of the non-thermochromic colorant in the ink composition is not particularly limited, but is optimally selected so as to obtain a desired color when the electron-donative color developing organic compound has been paled out. The amount of the non-thermochromic colorant is preferably in a range of from 0.001% by weight to 30% by weight, more preferably from 0.01% by weight to 15% by weight based on the ink composition.

The ink composition of the present invention may contain typical ingredients in addition to the above-mentioned ingredients. The typical ingredients are described below.

When the wax particles are produced by emulsification, the ink composition of the present invention may contain an emulsifier. The emulsifier is used in order to disperse the wax particles. The emulsifiers include, for example, polyvinyl alcohol, carboxymethyl cellulose, hydroxyethyl cellulose, sorbitan monostearate, polyoxyethylene derivative of sorbitan monostearate and polyoxyethylene stearyl ether.

The ink composition of the present invention may contain ingredients other than the above ingredients as necessary. Specifically, any of a lubricant, a wetting agent, an antirust, a preservative, a fungicide, a defoaming agent, a leveling agent, an agglomeration inhibitor, a pH adjustor and a surfactant may be added to the ink composition.

Then, a method for producing the present ink composition is described. In the production of the ink composition of the present invention, at least one of the dispersion (emulsion) in which the first wax particles are dispersed and the dispersion (emulsion) in which the second wax particles are dispersed is prepared. The dispersion can be prepared by using a known emulsifying method or an atomizing method which uses pulverization. An example of the preparing method of the dispersion in which wax particles are dispersed by emulsification will be explained hereinafter.

The dispersion in which the first wax particles are dispersed is prepared according to the procedures as follows. First, an electron-donative color developing organic compound and an electron-receptive compound are dissolved into a wax which has been heated to a temperature range of from 120° C. to 160° C. Apart from this, an aqueous solution of emulsifier, in which an emulsifier (e.g. polyvinyl alcohol) is dissolved into water, is warmed at a temperature range of from 30° C. to 60° C. The above wax solution is added to the warmed aqueous solution of the emulsifier, while the aqueous solution is subjected to mid-shear stirring. The wax solution is preferably added so that the weight ratio of the aqueous solution to the wax solution becomes within a range of from 95:5 to 50:50. Subsequently, the solution is subjected to high-shear stirring to obtain an O/W emulsion. The solution is cooled to room temperature with stirring, thereby a dispersion of the first wax particles containing the electron-donative color developing organic compound and the electron-receptive compound is obtained.

The dispersion in which the second wax particles are dispersed is prepared according to the procedures as follows. First, a decolorization agent is dissolved into a wax which has been heated to a temperature range of from 60° C. to 120° C. Apart from this, an aqueous solution of the emulsifier, in which an emulsifier (e.g. polyvinyl alcohol) is dissolved into water, is warmed at a temperature in a range of from 30° C. to 0.60° C. The above wax solution is added to the warmed aqueous solution of the emulsifier, while the aqueous solution is subjected to mid-shear stirring. The wax solution is preferably added so that the weight ratio of the aqueous solution to the wax solution becomes within a range of from 95:5 to 50:50. Subsequently, the solution is subjected to high-shear stirring to obtain an O/W emulsion. The solution is cooled to room temperature with stirring, and thereby a dispersion containing the decolorization agent is obtained.

When only the dispersion in which the first wax particles are dispersed is prepared, this dispersion is mixed with the decolorization agent. In such case, the aqueous solution in which the decolorization agent was dissolved may be mixed with the dispersion. In the case where both of the dispersion in which the first wax particles are dispersed and the dispersion in which the second wax particles are dispersed are prepared, the both dispersions are mixed together. The mixing procedure is performed by a known method, for example, by stirring any case, the mixing procedure is performed optimally selecting the mixing ratio of the dispersion to the aqueous solution or the mixing ratio of the two dispersions so that each of the electron-donative color developing organic compound, the electron-receptive compound, the decolorization agent, and water is contained in the proportion as mentioned above.

The ink composition of the present invention is preferably used as the ink for various kinds of writing instruments. The writing instrument preferably takes the form of, for example, an inner core type writing instruments such as a marking pen and a felt pen, or a ball-point pen, wherein the ink seeps out through the tip of the pen. The ball-point pen is a writing instrument, which includes a tubular holder, an ink-containing tube (portion) accommodated within the tubular holder and a pen tip, wherein a small ball is attached to the pen tip and the ink seeps out through the pen tip upon writing. The inner core type writing instrument is a writing instrument, which includes an inner core (or wick) as ink-containing tube which is formed by binding fibers into a bundle, and a pen point (tip) through which the ink filled in the inner core seeps out, the pen point member being, for example, a ball, a fiber, a plastic tip, a brush-like member and an ink brush-like member.

The writing instruments can be assembled by using known members. For example, the ball-point pen can be manufactured by assembling the ink-containing tube and the ball-point pen tip according to the known assembling method wherein the ink-containing tube is filled with the ink, which tube is formed from a known material into a known size, and the ball point pen tip is formed from a known material into a known size with using a known material. The ink-containing tube is, for example, a pipe made of a synthetic resin such as polyethylene and polypropylene, or a pipe made of a metal. The ball-point pen tip, which can be a typical member therefore, and the ball point pen tip having a difference of, for example, 0.01 mm or more between the diameter of the ball and the inside diameter of the ball house can be used.

Alternatively, the ink composition of the present invention can be used as an ink for printing (particularly an ink for an ink jet printer), a paint or a coating material.

The medium on which the writing trace or the coating film is formed with using the present ink composition is preferably a paper. Alternatively, the medium may be a film, a sheet or a plate formed from a synthetic paper, a cloth or a plastic, a sheet or a plate formed from a metal, or a sheet or a plate formed from a glass.

In the case where the ink composition of the present invention contains only the electron-donative color developing organic compound as the color developing ingredient, the writing trace or the coating film of the present ink composition comes to be decolorized, when the wax is heated to a temperature equals to or higher than the melting point of the wax. More specifically, the liquefaction of the wax causes the decolorization agent to access the electron-receptive compound which has been separated from the decolorization agent by the wax, and thereby the decolorization agent act on the electron-receptive compound to make the ink composition decolorized. When the melting point of the wax is in a range of from 40° C. to 120° C., the temperature for heating is preferably equals to or higher than the melting point of the wax, more preferably a 1° C. to 5° C. higher temperature than the boiling point of the wax. Such a heating temperature range makes it possible to conduct heating, for example, by scrubbing the writing trace or the coating film with a rubber or an elastic resin. The rubber or the resin to be used for erasing may be attached beforehand to an end of the writing instrument opposite to the pen tip. Thereby, it becomes easy to erase and correct one or more characters that was erroneously written, or erase the portions at where marking has been once made afterward. The resin for erasing is preferably a resin which has a high friction resistance to the paper surface, for example a styrene-butylene-styrene copolymer or a styrene-ethylene.butylene-styrene copolymer.

Alternatively, the heating can be performed by the passing over a heated roll or the blowing of a hot air flow. Use of the roll or the hot air flow can erase the writing trace which was written over a relatively large area or the coating film having a relatively large area at one shot. Thus, it is possible to construct a recycle system for repeatedly using papers on which writing or printing has been made by using the ink composition of the present invention in combination with the heating apparatus.

As mentioned above, the term "decolorizing" or "color erasing" not only covers a phenomenon in which the color is faded. Thus, even if the ink composition is not completely made colorless state, it can be applied to practical usage as the discolorable ink composition. In the case where the written characters are not completely decolorized but remain a color at a portion of the writing trace, the discoloring operation for confidentiality reasons is successful as long as the colored portion remaining on the writing trace is not readable. In the case where the present ink composition is used for decolorizing operation, it is preferable that the color is faded to show a difference of the color difference E (i.e. $\Delta E'-\Delta E''$) being 5 or more after heated, provided that the electron-donative color developing organic compound has a black color, and a color difference E ($\Delta E$) measured by a colorimeter before heating is $\Delta E'$, and a color difference E ($\Delta E$) measured by the color difference meter after heating is $\Delta E''$.

In the case where the ink composition of the present invention contains the non-thermochromic colorant as mentioned above and is intended to be used for discoloring so that the color of the non-thermochromic colorant predominantly appears by heating, the writing trace or the coating film is discolored by being scrubbed with an elastic resin to liquefy wax as mentioned above. Alternatively, the ink composition of the present invention may be one wherein several kinds of wax particles having melting points different from each other contain several kinds of electron-donative color developing organic compounds respectively, together with the electron-receptive compound. Such an ink composition shows multiple stepwise discoloring showing different colors when changing the heating temperature stepwise.

EXAMPLES

Preparation of First Wax Particles Dispersions 1 to 5

The following three compounds were supplied as the electron-donative color developing organic compounds, stearyl alcohol, recinoleic acid amide and a mixture of glycerin distearate with glycerin tristearate were supplied as the waxes, zinc salt of 3,5-di(alpha-methylbenzyl) salicylic acid was supplied as the electron-receptive compound, and polyvinyl alcohol was supplied as the emulsifier.

Electron-donative color developing organic compound 1: 2'-[(2-chlorophenyl)amino]-6'-(dibutylamino)spiro[isobenzofluoran-1(3H),9'-(9H)xanthene]-3-one;

Electron-donative color developing organic compound 2: 6'-[ethyl(4-methylphenyl)amino]-2'-methyl-spiro[isobenzofluoran-1(3H), 9'-[9H]xanthene]-3-one;

Electron-donative color developing organic compound 3: 6-(dimethylaminoamino)-3,3-bis[4-(dimethylamino)phenyl]-1(3H)-isobenzofluoran.

Combinations of the above electron-donative color developing organic compounds with the electron-receptive compounds show the colors as shown in Table 1, respectively.

The electron-donative color developing organic compound and the electron-receptive compound were dissolved into the wax heated up to 160° C. Apart from the above, an aqueous solution of the emulsifier, in which polyvinyl alcohol as the emulsifier was dissolved into water, was warmed to 65° C. While the warmed aqueous solution of the emulsifier was subjected to mid-shear stirring, the above wax solution was added to this aqueous solution. Subsequently, the solution was subjected to high-shar stirring to give an O/W emulsion. The solution was cooled to room temperature with stirring, and thereby a dispersion of the first wax particles containing the electron-donative color developing organic compound and the electron-receptive compound was obtained. The wax solution and the aqueous solution of the emulsifier were prepared and mixed, so that the finally obtained dispersion had the composition as shown in the following Table 1. The wax particles in the dispersion had a particle diameter of from about 5 μm to about 50 μm after cooled.

Preparation of Dispersion 6

A dispersion in which the electron-donative color developing organic compound 1, the electron-receptive compound, and an emulsifier were merely dispersed in water was prepared. The dispersion was prepared so as to have the composition as shown in the following Table 1.

TABLE 1

| Composition | Dispersion 1 | Dispersion 2 | Dispersion 3 | Dispersion 4 | Dispersion 5 | Dispersion 6 |
|---|---|---|---|---|---|---|
| Electron-donative color developing organic compound 1 | 1.50 | | | 1.50 | 1.50 | 4.00 |
| Electron-donative color developing organic compound 2 | | 1.50 | | | | |
| Electron-donative color developing organic compound 3 | | | 1.50 | | | |
| Electron-receptive compound | 3.50 | 3.50 | 3.50 | 3.50 | 3.50 | 10.00 |
| Wax (stearyl alcohol) | 35.0 | 35.0 | 35.0 | | | |
| Wax (recinoleic acid amide) | | | | 35.0 | | |
| Wax (mixture of glycerin distearate with glycerin tristearate) | | | | | 35.00 | |
| Emulsifier (polyvinyl alcohol) | 3.00 | 3.00 | 3.00 | 3.00 | 3.00 | 9.00 |
| Ion exchanged water | 57.00 | 57.00 | 57.00 | 57.00 | 57.00 | 77.00 |
| Total | 100.00 | 100.00 | 100.00 | 100.00 | 100.00 | 100.00 |
| Color | black | red | blue | black | black | black |

* composition is shown in % by weight

Preparation of Second Wax Dispersions A to H

The following compounds as shown in Table 2 were supplied as the decolorization agents, stearyl alcohol, paraffin wax, glycerin monostearate, glycerin distearate, and the mixture of glycerin distearate with glycerin monostearate were supplied as the waxes, and polyvinyl alcohol was supplied as the emulsifier.

The decolorization agent was dissolved into the wax which was heated up to 120° C. Separately, an aqueous solution of the emulsifier, in which polyvinyl alcohol as the emulsifier was dissolved into water, was warmed to 65° C. While the warmed aqueous solution of the emulsifier was subjected to mid-shear stirring, the above wax solution was added to this aqueous solution. Subsequently, the solution was subjected to high-shear stirring to give an O/W emulsion. The solution was cooled to room temperature with stirring, and thereby a dispersion of the second wax particles containing the decolorization agent was obtained. The wax solution and the aqueous solution of the emulsifier were prepared and mixed so that the finally obtained dispersion had the composition as shown in the following Table 2. The wax particles in the dispersion had a particle diameter of from about 5 μm to about 50 μm after cooled.

TABLE 2

| Composition | Dispersion A | B | C | D | E | F | G | H |
|---|---|---|---|---|---|---|---|---|
| Dioctyl amine | 3.50 | | | | | | | |
| Hydrogenated tallow propylene diamine | | | | | | 3.50 | | |
| Butyleneoxide adduct of diethylenetriamine | | 3.50 | | | | | 3.50 | |
| 2-Phenylimidazole | | | 3.50 | | | | | |
| Diaminodecane | | | | 3.50 | | | | |
| Benzylethanolamine | | | | | 3.50 | | | |
| Tetrakis(2,2,6,6-tetramethyl-4-piperidyl)-1,2,3,4-butane tetracarboxylate | | | | | | | | 3.50 |
| Wax (stearyl alcohol) | 36.00 | 36.00 | 36.00 | 36.00 | 36.00 | | | |
| Wax (paraffin wax) | | | | | | 36.00 | | |
| Wax (glycerin monostearate) | | | | | | | 36.00 | |
| Wax (mixture of glycerin distearate with glycerin tristearate) | | | | | | | | 36.00 |
| Emulsifier (polyvinyl alcohol) | 3.00 | 3.00 | 3.00 | 3.00 | 3.00 | 3.00 | 3.00 | 3.00 |
| Ion exchanged water | 57.50 | 57.50 | 57.50 | 57.50 | 57.50 | 57.50 | 57.50 | 57.50 |
| Total | 100.00 | 100.00 | 100.00 | 100.00 | 100.00 | 100.00 | 100.00 | 100.00 |

Decolorization Agent Aqueous Solution a-c

Triisopropanolamine, pentaethylenehexamine and xylylenediamine were prepared as the decolorization agents, and dissolved into ion exchanged water to obtain Aqueous solutions a-c each containing the decolorization agent in an amount of 15% by weight, respectively.

Example 1

A discolorable ink composition was prepared by mixing Dispersion 1 of the first wax particles with Dispersion A of the second wax particles in a weight ratio of 50:50. The obtained discolorable ink composition was applied onto a piece of Kent paper using a bar coater of 20 micrometers so as to form a coating film and then dried at room temperature. After dried, the Kent paper was heated up to 65° C. The drying operation was performed by placing the paper in a constant-temperature oven.

The color optical densities before and after the heating operation were evaluated by determining the color difference (ΔE) between the color of the writing trace and the color of the paper surface using a colorimeter CR-300 (available from former Minolta Co., Ltd.). As the value of the difference between the ΔE values, it shows that the writing trace is erased more successfully. The color difference is represented by the formula:

$$\Delta E = \sqrt{(\Delta L^*)^2 + (\Delta a^*)^2 + (\Delta b^*)^2}$$

wherein L* is the lightness index, a* and b* each shows chromaticness indexes.

Table 3 shows the ΔE before and after heating. Then, the Kent paper after heated was cooled to −25° C. The color optical density of the coating film on the Kent paper showed no increasing, that is, no color development occurred again by cooling. This fact shows that the decolorization of the discolorable ink composition of the present invention is an irreversible phenomenon.

Examples 2-16

One dispersion selected from the dispersions 1 to 3 of the first wax particles was mixed with one dispersion selected from Dispersions A to E of the second wax particles or one aqueous solution selected from Decolorization agent aqueous solution a to c in a ratio as shown in Table 3, giving each discolorable ink composition. Each of the obtained discolorable ink compositions was applied to a Kent paper to form a coating film, and then the color optical density before and after the heating operation was evaluated in each Example in the same manner as Example 1. Table 3 shows the results of the evaluation. In each of Examples 2 to 16, although the Kent paper after heated was cooled to −25° C., the color optical density (ΔE) of the coating film on the Kent paper showed no increasing.

Comparative Example 1

The dispersion 4 (which is a dispersion of the electron-donative color developing organic compound and the electron-receptive compound, containing no wax ingredient) was mixed with pentaethylenehexamine as the decolorization agent in a ratio as shown in Table 3, giving a discolorable ink composition. The obtained discolorable ink composition was applied onto a piece of Kent paper in the same manner as Example 1 to form a coating film and then the color optical density before and after heating was evaluated. Table 3 shows the result of the evaluation.

TABLE 3

| Composition | Example 1 | Example 2 | Example 3 | Example 4 | Example 5 | Example 6 | Example 7 | Example 8 |
|---|---|---|---|---|---|---|---|---|
| Dispersion 1 | 50.00 | 50.00 | 33.00 | 50.00 | 25.00 | 67.00 | 67.00 | 67.00 |
| Dispersion 2 | | | | | | | | |
| Dispersion 3 | | | | | | | | |
| Dispersion 4 | | | | | | | | |
| Dispersion 5 | | | | | | | | |
| Dispersion A | 50.00 | | | | | 33.00 | | |
| Dispersion B | | 50.00 | | | | | | |
| Dispersion C | | | 67.00 | | | | | |
| Dispersion D | | | | 50.00 | | | 33.00 | |
| Dispersion E | | | | | 75.00 | | | |
| Dispersion F | | | | | | | | |
| Dispersion G | | | | | | | | |
| Dispersion H | | | | | | | | |
| Aqueous solution a | | | | | | | | 33.00 |
| Aqueous solution b | | | | | | | | |
| Aqueous solution c | | | | | | | | |
| Dispersed liquid 4 | | | | | | | | |
| Pentaethylene haxane | | | | | | | | |
| Total | 100.00 | 100.00 | 100.00 | 100.00 | 100.00 | 100.00 | 100.00 | 100.00 |
| (Electron-donative color developing organic compound) | 0.75 | 0.75 | 0.50 | 0.75 | 0.38 | 1.00 | 1.00 | 1.00 |
| (Electron-receptive compound) | 1.75 | 1.75 | 1.12 | 1.75 | 0.88 | 2.35 | 2.35 | 2.35 |
| (Decolorization agent) | 1.75 | 1.75 | 2.34 | 1.75 | 2.62 | 1.16 | 1.16 | 4.95 |
| ΔE before heating | 26.50 | 32.90 | 25.70 | 30.60 | 17.60 | 31.50 | 38.90 | 37.80 |
| ΔE after heating | 4.10 | 12.20 | 19.30 | 3.60 | 10.20 | 6.00 | 24.30 | 21.60 |

| Composition | Example 9 | Example 10 | Example 11 | Example 12 | Example 13 | Example 14 | Example 15 | Example 16 | Comp. Example 1 |
|---|---|---|---|---|---|---|---|---|---|
| Dispersion 1 | 67.00 | 80.00 | 67.00 | | | | | | |
| Dispersion 2 | | | | 50.00 | | | | | |
| Dispersion 3 | | | | | 50.00 | | | | |
| Dispersion 4 | | | | | | 50.00 | | | |
| Dispersion 5 | | | | | | | 50.00 | 33.00 | |
| Dispersion A | | | | | | | | | |
| Dispersion B | | | | | | | | | |
| Dispersion C | | | | | | | | | |
| Dispersion D | | | | 50.00 | 50.00 | | | | |
| Dispersion E | | | | | | | | | |
| Dispersion F | | | | | | 50.00 | | | |
| Dispersion G | | | | | | | 50.00 | | |
| Dispersion H | | | | | | | | 67.00 | |
| Aqueous solution a | | | | | | | | | |
| Aqueous solution b | 33.00 | 20.0 | | | | | | | |
| Aqueous solution c | | | 33.00 | | | | | | |
| Dispersed liquid 4 | | | | | | | | | 91.00 |
| Pentaethylene haxane | | | | | | | | | 9.00 |
| Total | 100.00 | 100.00 | 100.00 | 100.00 | 100.00 | 100.00 | 100.00 | 100.00 | 100.00 |
| (Electron-donative color developing organic compound) | 1.00 | 1.20 | 1.00 | 0.75 | 0.75 | 0.75 | 0.75 | 0.50 | 3.64 |
| (Electron-receptive compound) | 2.35 | 2.80 | 2.35 | 1.75 | 1.75 | 1.75 | 1.75 | 1.12 | 9.10 |
| (Decolorization agent) | 4.95 | 3.00 | 4.95 | 1.75 | 1.75 | 1.75 | 1.75 | 2.34 | 9.00 |
| ΔE before heating | 38.90 | 46.40 | 35.80 | 44.90 | 67.80 | 44.20 | 52.50 | 41.60 | 23.60 |
| ΔE after heating | 9.90 | 29.90 | 17.20 | 3.00 | 3.30 | 6.40 | 9.60 | 6.60 | 24.20 |

The above results show that the discolorable ink composition in a form wherein the electron-donative color developing organic compound in the colored state is separated from the decolorization agent by the wax particles successfully decolorizes by heating. Although the content of the electron-donative color developing organic compound was relatively high in Comparative Example 1, the value of ΔE before heating was small and the value of ΔE did not lower after heating, which means that Comparative Example 1 failed to have the discoloring property.

Examples 17-18

One dispersion selected from the dispersions 1 to 3 of the first wax particles, one dispersion selected from the dispersions A to E of the second wax particles, and a non-thermochromic colorant were mixed in a ratio as shown in Table 4, giving each discolorable ink composition. Two colorant as shown below were supplied. Each of the obtained discolorable ink compositions was applied onto a Kent paper to form a coating film, and then the color optical density before and after the heating operation was evaluated in each Example in the same manner as Example 1. In each ink composition, the hue after heating was different from that before the heating. Thus each ink composition showed the ability to discolor from an achromatic color to a chromatic color or from one chromatic color to another chromatic color.

Colorant 1: Magenta pigment dispersion: CAB-O-JET 260M Magenta (manufactured by Cabot Corp.)

Colorant 2: fluorescent yellow colored resin particle dispersion: "LUMIKOL NKW C2105E" (manufactured by Nippon Keiko Kagaku CO., Ltd.)

TABLE 4

| | Example | |
|---|---|---|
| Composition | 17 | 18 |
| Dispersion 1 | 49.00 | |
| Dispersion 2 | | |
| Dispersion 3 | | 41.00 |
| Dispersion A | | |
| Dispersion B | | |
| Dispersion C | | |
| Dispersion D | 49.00 | 41.00 |
| Dispersion E | | |
| Aqueous solution a | | |
| Aqueous solution b | | |
| Aqueous solution c | | |
| Colorant 1 | 2.00 | |
| Colorant 2 | | 18.00 |
| Total | 100.00 | 100.00 |
| (Electron-donative color developing organic compound) | 0.75 | 0.75 |
| (Electron-receptive compound) | 1.75 | 1.75 |
| (Decolorization agent) | 1.75 | 1.75 |
| Hue before heating | gray | green |
| Hue after heating | pink | yellowish green |

INDUSTRIAL APPLICABILITY

The discolorable ink composition of the present invention is capable to substantially and irreversibly change its color to colorless state or another color, and it is useful for the ink for writing instruments or the printing inks as the ink for the jet printer.

The invention claimed is:

1. A thermally discolorable ink composition comprising wax particles that contain an electron-donative color developing organic compound and an electron-receptive compound, a particulate decolorization agent, and water, wherein the wax particles and the particulate decolorization agent are dispersed in water.

2. The discolorable ink composition according to claim 1, wherein the decolorization agent is a basic compound.

3. The discolorable ink composition according to claim 2, wherein the decolorization agent is a compound selected from an aliphatic amine, an aliphatic diamine, an amino alcohol, an aromatic compound having at least one amino group and an alkylene group between the amino group and an aromatic ring in the molecule, a compound represented by a general formula $NH_2-C_2H_4-(NH-C_2H_4)_n-NH_2$ ($n \geq 0$) and derivatives thereof, imidazole and derivatives thereof, and a compound generally referred to as a hindered amine, which compound has a piperidyl group and derivatives thereof in the molecule.

4. The discolorable ink composition according to claim 1, wherein the wax has a melting point in a range of from 40° C. to 120° C.

5. The discolorable ink composition according to claim 1, wherein the electron-receptive compound is nonvolatile.

6. The discolorable ink composition according to claim 1, which further comprises a colorant which does not discolor by heating.

7. A writing instrument that includes the discolorable ink composition according to claim 1.

8. An ink jet printer ink comprising the discolorable ink composition according to claim 1.

9. A thermally discolorable ink composition comprising a wax particle that contains an electron-donative color developing organic compound and an electron-receptive compound, another wax particle that contains a decolorization agent, and water.

10. The discolorable ink composition according to claim 9 wherein the decolorization agent is a basic compound.

11. The discolorable ink composition according to claim 10, wherein the decolorization agent is a compound selected from an aliphatic amine, an aliphatic diamine, an amino alcohol, an aromatic compound having at least one amino group and an alkylene group between the amino group and an aromatic ring in the molecule, a compound represented by a general formula $NH_2-C_2H_4-(NH-C_2H_4)_n-NH_2$ ($n \geq 0$) and derivatives thereof, imidazole and derivatives thereof, and a compound generally referred to as a hindered amine, which compound has a piperidyl group and derivatives thereof in the molecule.

12. The discolorable ink composition according to claim 9, wherein the wax has a melting point in a range of from 40° C. to 120° C.

13. The discolorable ink composition according to claim 9, wherein the electron-receptive compound is nonvolatile.

14. The discolorable ink composition according to claim 9, which further comprises a colorant which does not discolor by heating.

15. A writing instrument that includes the discolorable ink composition according to claim 9.

16. An ink jet printer ink comprising the discolorable ink composition according to claim 9.

* * * * *